United States Patent [19]

Yagisawa

[11] 4,202,202

[45] May 13, 1980

[54] METHOD AND APPARATUS FOR DETECTING DEFLECT IN LIQUID METAL HANDLING INSTRUMENTS

[75] Inventor: Hideji Yagisawa, Mito, Japan

[73] Assignee: Doryokuro Kakunenryo Kaihatsu Jigyodan, Tokyo, Japan

[21] Appl. No.: 974,518

[22] Filed: Dec. 29, 1978

[30] Foreign Application Priority Data

Jan. 12, 1978 [JP] Japan ................................ 53-1542

[51] Int. Cl.$^2$ ............................................. G01M 3/04
[52] U.S. Cl. ........................................ 73/40; 73/40.7
[58] Field of Search ................... 73/40, 40.5 R, 40.7, 73/49.2, 49.1; 356/237, 241

[56] References Cited

U.S. PATENT DOCUMENTS

| | | | |
|---|---|---|---|
| 3,762,212 | 10/1973 | Morley et al. | 73/40.7 |
| 4,039,376 | 8/1977 | Wachter | 73/40 X |

OTHER PUBLICATIONS

*Ferritic Steels for Fast Reactor Steam Generators.* In Proceedings of an Int'l Conf. held by the British Nuclear Energy Soc. Ed. by Pugh and Little. vol. 1, pp. 16-21, 1978.

*Primary Examiner*—Gerald Goldberg
*Assistant Examiner*—Joseph W. Roskos
*Attorney, Agent, or Firm*—Wenderoth, Lind & Ponack

[57] ABSTRACT

Method and apparatus for detecting the position of defects in a liquid metal handling instruments such as sodium-heated steam generator, which has a conduit structure invisible from the outside of the instrument. The conduit structure, which is used in a liquid metal, is positioned in a vessel filled with an inert gas. The vessel is sealed whereas a liquid inactive to the liquid metal is filled in the conduit structure. If there exists a defective spot in the conduit structure, the liquid will flow out of the defective spot, which is exactly detected by application of a fiber scope.

8 Claims, 7 Drawing Figures

METHOD AND APPARATUS FOR DETECTING DEFLECT IN LIQUID METAL HANDLING INSTRUMENTS

BACKGROUND OF THE INVENTION

The present invention relates to a method of promptly, safely and exactly detecting a defect formed in such a structural part of an apparatus which handles a liquid metal as being invisible directly from the outside of the apparatus, e.g. a heat transfer tube nest of a sodium-heated steam generator, as well as to a device for carrying out the method.

Heat exchangers as generally referred to as intermediate heat exchanger or steam generator are used in a nuclear reactor of a type called fast breeder which makes use of, for example liquid sodium. A large number of heat transfer tubes are disposed in these heat exchangers, such that heat is exchanged between two fluids flowing inside and outside of the heat transfer tubes, across the wall of the latter.

Although the severest consideration has been taken in the selection of material, design and manufacture of these heat transfer tube, it is impossible to completely preclude the possibility of leaking accident.

When a leaking accident has taken place, it is most important and significant to thoroughly investigate the cause of the accident. Unless the cause of the leaking accident is clarified and removed, the accident will repeatedly take place, even if a stopgap measure, such as closing the ends of the defective tube by plugs, is taken. Thus, once the leaking accident takes place, it becomes necessary to suspend the operation of the plant for a long period of time, for clarifying and removing the cause of the accident, which considerably lowers the efficiency of work of the plant.

Usually, these heat exchangers are of a type so called shell and tube type, in which a heat transfer tube nest is removably installed in a shell, so as to facilitate the protective maintenance and repair. However, it is almost impossible to inspect these tubes by naked eyes, because of a specific condition of attaching of sodium and complicated arrangement of the heat transfer tubes. Thus, no effective method of inspection has been established yet for these specific conditions.

To explain in more detail, there have been proposed and used various methods of detecting defects during the use of the heat exchanger, e.g. ultrasonic wave method, eddy current method, acoustic emission method (AE method) and so forth. These conventional methods are, however, not effective enough for remote examination of heat transfer tubes for the following reasons. Namely, for the first point, it is difficult to insert the probe and handle the same in the heat exchanger. For the second point, it takes a considerably long time to scan the probe to examine the entire area of the heat exchanger in the circumferential and longitudinal directions. For the third point, the sensitivity of detection is considerably deteriorated, because of the signals reflected by support members disposed outside of the heat transfer tubes and by scales of sodium attaching to the heat transfer tubes, as well as non-directional signals emitted by welded metal parts.

It is therefore necessary to work out a novel method of defect detection which would afford inspection of complicated structural part of apparatus for use in liquid metal, well meeting the above stated specific condition of detection.

Accordingly, an object of the present invention is to provide a method of promptly and surely detecting the position of the defect in liquid metal handling instruments.

Another object of the present invention is to provide a method which allows a prompt and thorough investigation of the cause of the defect in liquid metal handling instruments.

Another object of the present invention is to provide a method of detecting the position of the defect in liquid metal handling instrument, which allows a repairing work in a minimum time.

Another object of the present invention is to provide an apparatus which permits a prompt and reliable investigation of the position of the defect in liquid metal handling instruments.

A further object of the present invention is to provide an apparatus which permits a thorough investigation of the cause of the defect in liquid metal handling instruments.

SUMMARY OF THE INVENTION

Briefly, the invention provides in its one aspect a method of detecting a defect in a liquid metal handling instrument wherein the instrument has a conduit structure invisible from the outside of the instrument. In the method, the conduit structure, which is used in a liquid metal, is positioned in a vessel filled with an inert gas, and the vessel is sealed. A liquid inactive to the liquid metal is filled in the conduit structure so that the liquid may leak out of a defective spot if such a defective spot exists in the conduit structure. After the conduit structure is filled with the liquid whereas the inert gas atmosphere is maintained in the vessel, a fiber scope is inserted into the vessel so as to detect an exact position of the defective spot from which the liquid leaks.

According to another aspect of the invention, there is provided a device for detecting defect in liquid metal handling heat exchanger comprising a vessel of a size large enough to accomodate a heat transfer tube nest of the heat exchanger. The vessel has at its one end a juncture for close fitting with the flange of the heat transfer tube nest and at its other end a sealing closure member. The vessel is further provided at its body portion with an opening for charging an inert gas, a glove adapter for detachably attaching the glove for operation and a scope insertion opening through which a fiber scope is inserted into the vessel. The vessel is so constructed as to maintain an atmosphere of the inert gas therein.

Other objects and features of the present invention will become apparent from the detailed description of preferred embodiments of the invention which will be read with reference to the accompanying drawings.

PREFERRED EMBODIMENT OF THE INVENTION

Figure 1:
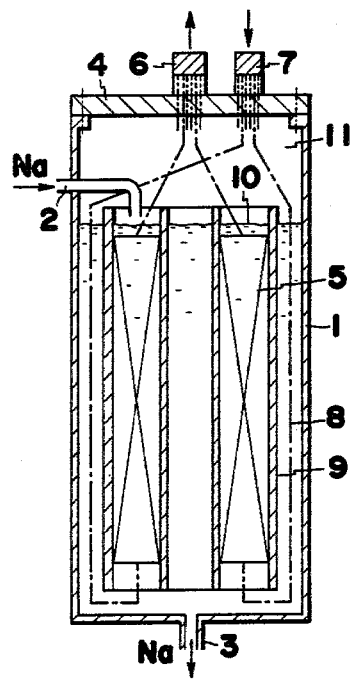
FIG. 1 is a simplified sectional view of a shell and tube type steam generator which is to be inspected.

Referring first to FIG. 1 showing a shell and tube type steam generator, a liquid sodium inlet section 2 and a liquid sodium outlet section 3 are formed at the upper and lower end portions of a cylindrical shell 1, respectively. The shell 1 is provided at its uppermost portion with a flange 4 for suspending a heat transfer tube nest. More specifically, the tube nest 5 consisting of a helical coils is disposed in the shell 1. The tubes are connected at their one ends to a steam outlet tube plate section 6 and at their other ends to a feed water inlet tube plate section 7 which are formed in the flange 4. The tube nest 5 is separated from downcomers 8 by shrouds 9.

It will be understood from the foregoing that, liquid sodium is introduced into the shell 1 through the inlet section 2 and flows downwardly, making a heat exchange with the water flowing inside the tubes of the helical tube nest 5, and discharged out of the shell through the outlet section 3. Meanwhile, the water flows into the shell through the feed water inlet tube plate section 7 and moves downwardly through the downcomers 8. The water then flows into the tubes of the tube nest 5 through the lower ends of the tubes, and is heated to become a steam as it flows upwardly through the heat transfer tubes, as a result of the heat exchange with the liquid sodium. The generated steam is discharged through the steam outlet tube plate section 6. The space above the level 10 of the liquid sodium is a cover gas plenum 11.

As stated before, the instant steam generator is of shell and tube type. Therefore, as the flange 4 is lifted away from the shell 1 after the loosening and removal of bolts by which the flange 4 is fixed to the shell 1, the tube nest 5 can be withdrawn from the shell 1 together with the flange 4.

Supposing here that a leakage has taken place in a tube of the helical tube nest 5, the position of the leakage cannot be observed by naked eyes, even after the withdrawal of the tube nest 5, because of the presence of the shrouds 9. Even when there is no shroud 9, it is almost impossible to observe the inside of the tube nest consisting of some tens of tubes. In addition, the sodium attached to the outside of the heat transfer tubes makes it impossible to examine the tube surface in the atmosphere.

Figure 2:
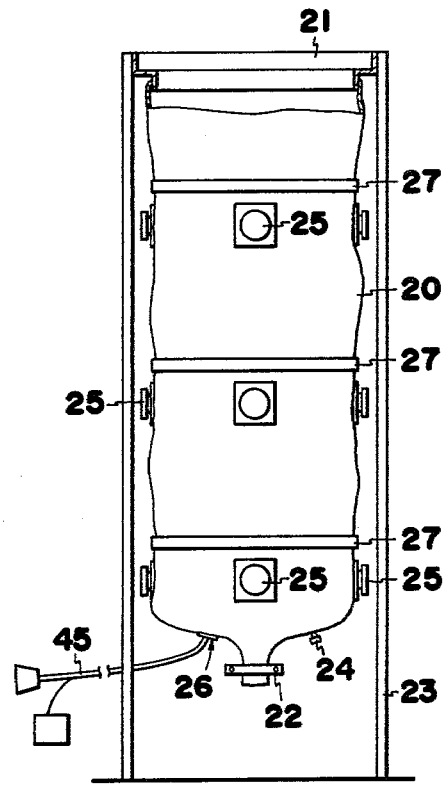
FIG. 2 is an elevational view of an apparatus for detecting the position of the defect in liquid metal handling instrument, such as the steam generator, illustrated in FIG. 1.

FIG. 2 is an illustration of a device constructed in accordance with an embodiment of the invention. This device has a transparent cylindrical vessel 20 made of a plastic material such as heat-resistant vinyl. The transparent cylindrical vessel 20 is provided at its upper end with a split type flange 21 adapted for a close fit with the flange 4 for suspending the heat transfer tube nest of the steam generator. A closure member 22 for sealingly closing the lower end of the cylindrical vessel 20 is attached to the lower end of the latter. The cylindrical vessel as a whole is adapted to be supported by means of frameworks 23. In the body portion of the transparent cylindrical vessel 20, formed are an inlet 24 for charging therefrom an inert gas, glove adapters 25 for detachably attaching the glove for operation, and a scope insertion opening 26 through which a fiber scope 45 is inserted into the transparent cylindrical vessel 20. It is to be understood that the transparent cylindrical vessel 20 is so constructed as to be able to maintain therein an atmosphere of inert gas. Bands 27 are fitted around the body portion of the vessel 20, at suitable portions of the latter, so as to prevent the body portion of the vessel from being partially or abnormally inflated by the internal pressure. In the illustrated embodiment, the adapters 25 are provided in three stages, four adapters in each stage.

Figure 3:
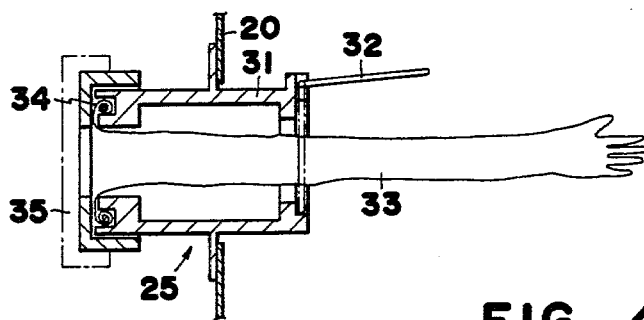
FIG. 3 is a sectioned view of a glove adapter which is fitted to the apparatus shown in FIG. 2.

In FIG. 3 which shows in detail the attachment of the glove for operation to the transparent cylindrical vessel 20 by means of the glove adapter 25, a tubular member 31 is provided to penetrate the wall of the transparent cylindrical vessel 20 made of heat-resistant vinyl. A swingable sealing plate 32 of check valve type is attached to the inner end of the tubular member 31, while a portion 34 for fixing the base portion of the operation glove 33 is formed at the outer end of the tubular member 31. Further, the outer end of the tubular member is so formed that a cap seal 35 for closing the outer end may be detachably secured to the tubular member 31. This glove adapter 25 may be used as an opening for insertion of repairing tools into the cylindrical vessel 20, when the adapter is not used for its original purpose, i.e. when no operation glove 33 is attached to the adapter 25.

Figure 4:
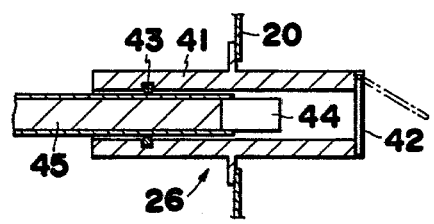
FIG. 4 is a sectional view of an opening for inserting a scope therethrough, which is fitted to the apparatus illustrated in FIG. 2.

Referring now to the scope insertion opening 26 as shown in FIG. 4, it consists of a tubular member 41 penetrating the wall of the transparent cylindrical vessel 20, a check valve type swingable plate 42 attached to the inner end of the tubular member 41 and an "O" ring seal 43 attached to the inner peripheral wall of the tubular member 41. The arrangement is such that the tubular member 41 receives a fiber scope 45, which has at its end an objective lens and a light guide 44, with the minimized leakage of the inert gas through the annular gap between the fiber scope 45 and the tubular member 41.

The inspection of the heat transfer tube nest is carried out in the following procedure.

Figure 5:
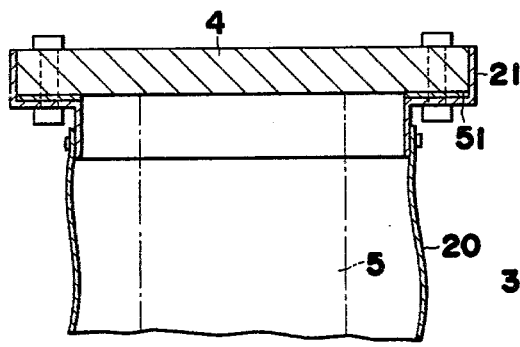
FIG. 5 is a sectioned view of a part of the inventive apparatus, showing a junction flange.
Figure 6:
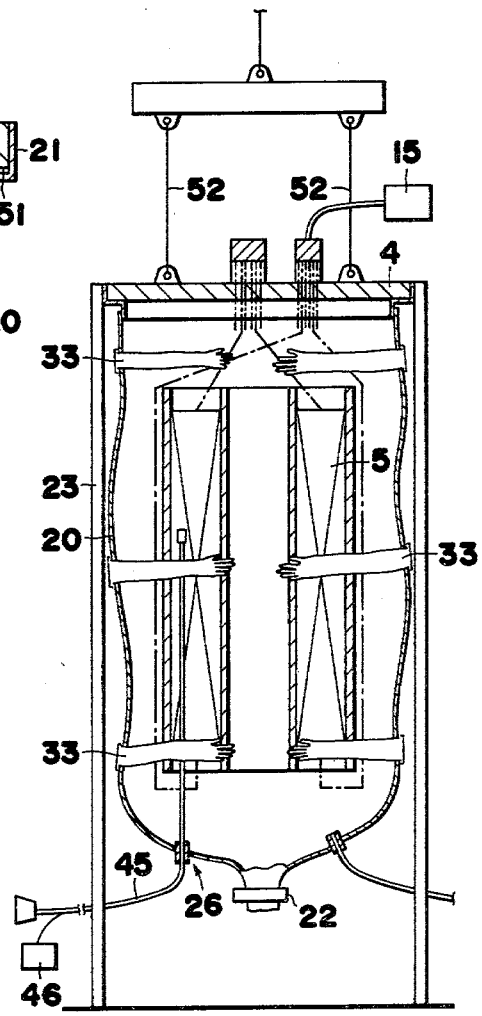
FIG. 6 is an elevational view of the apparatus illustrated in FIG. 2, showing the apparatus in use.

First of all, the steam generator is enveloped by the transparent cylindrical vessel 20 made of heat resistant vinyl, together with the shell 1. Then, an inert gas is supplied into the vessel 20 through the inert gas inlet 24, so that an atmosphere of the inert gas may favorably be maintained in the transparent cylindrical vessel 20. The insertion of the shell 1 into the transparent cylindrical vessel 20 can readily be accomplished because of the split type construction of the flange 21. Then the flange 4 which suspends the tube nest is separated from the shell 1, and is attached to the split type flange 21 of the top of the vessel 20 through a medium of a packing 51, as shown in FIG. 5. Then, the flange 4 is lifted by means of a wire 52 or the like, and is extracted out of the shell 1. Thus, the shell 1 is removed out of the vessel 20 from the lower end thereof. Then, the lower end of the transparent cylindrical vessel 20 is sealingly closed by means of the closure member 22. Subsequently, the assembly of the transparent cylindrical vessel 20 and the flange 4 suspending the tube nest is supported by the frameworks 23, as shown in FIG. 6. Throughout the period of this setting work, the space in the transparent cylindrical vessel 20 is held under the atmosphere of the inert gas.

After the setting work, the water side of the heat transfer tubes, i.e. spaces inside the heat transfer tube nest 5 is filled with a liquid which is inactive to sodium, e.g. volatile toluene, and is pressurized by a compressed nitrogen gas supplied through the gas supply system 15.

Figure 7:
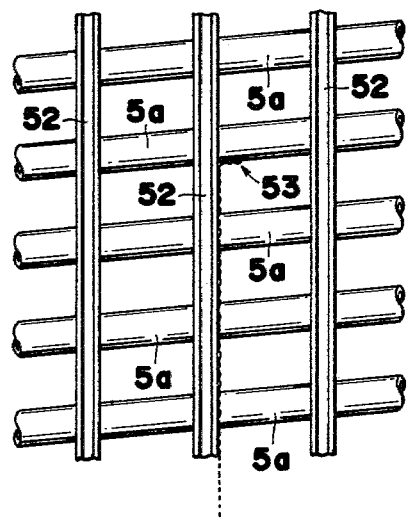
FIG. 7 is a perspective view of a conduit structure, showing a liquid leaking out of the conduit structure.

If there is any defect in the heat transfer tube nest, the toluene will leak out of the tube nest 5 through the defective point, and will drop in the form of droplets from the lower end of the heat transfer tube nest. Supposing that the helical heat transfer tube 5a is supported by, for example, an H-shaped steel beam 52 as shown in FIG. 7, the toluene leaked through the defective part 53 will flow downwardly along one of the walls of the H-shaped steel beam 52. It is therefore possible to determine the circumferential coordinate of the position of the defect, from the position of the droplets of the toluene.

Then, the fiber scope 45 is inserted into the transparent cylindrical vessel 20 through the scope insertion opening 26, and is moved upward manually within the space between adjacent tubes with the aid of the operation glove 33 so as to observe the trace of the leaked toluene. Thus, it is possible to determine the heightwise coordinate of the position of the defect.

After the determination of the circumferential and heightwise coordinates of the defective position, the water side of the heat transfer tubes is pressurized again by the gas supply system 15 so that the toluene may be jetted out through the defective portion.

It is possible, through an observation of the state of jetting of the toluene, to exactly grasp the position of the defect. At the same time, it is possible to know the presence of wastage which is such a phenomenon caused by the reaction of sodium with water that the portion of the heat transfer tube around the small defect is further corroded or eroded by the water or vapor jetting out through the small defect. In addition, through a reconsideration of the construction of the defective part, it is possible to grasp the cause of the defect, as well as to take necessary measure to prevent the recurrence of the accident.

In the observation of the defective part, it is possible to record the states of the defect and the area around the defect, by the use of a camera 46. Also, the size of the opening of the leakage can be estimated from the rate of loss of the toluene.

Thus, according to the invention, it is possible to promptly and exactly find the position and state of the defect, as well as to make a thorough investigation of the cause of the defect.

The device as shown in FIG. 2 can be used also for repairing the defective part of the heat transfer tube. To this end, the glove adapter 25 can be used as an opening for the insertion of the tools by releasing the glove 33 from the adapter. In case of an incidental local accident, i.e. in case that the defect has taken place only locally and that the safe condition of the whole apparatus can be recovered by the elimination of the local defect, the repair work is made in the following manner.

Namely, the cap seal 35 of the glove adapter 25 to which no operation glove 33 is attached is removed for the insertion of the tools and materials necessary for the repair. During the insertion of the tools and materials, the swingable sealing plate 32 functions as a check valve or non-return valve, so as to minimize the external leak of the inert gas. After the insertion of the tools and materials, the cap seal 35 is fitted again to seal the transparent cylindrical vessel. Then, the swingable sealing plate 32 of the tubular member of glove adapter in which the tools and materials are placed is opened manually by making use of the operation glove 33 attached to the other glove adapter 25, and the tools and materials are brought into the transparent cylindrical vessel. Subsequently, the defective heat transfer tube having leak and wastage is cut by making use of the tools, at its upper portion residing in the gas plenum 11. Then, a plug is fitted and welded to the opened end of the heat transfer tube. During this repair work, the inert gas atmosphere is maintained in the transparent cylindrical vessel 20.

The conventional repairing method consisting in a plugging of a certain defective tube end at the tube plate 6, 7 by an explosion fitting or welding involved various problems. According to the invention, however, the repair work does not thermally affect the other heat transfer tubes and, therefore, causes no problem attributable to the thermal stress, because the plug is fitted to the cut end of the defective heat transfer tube in the gas plenum 11.

Further, it is possible to previously install somespare heat transfer tubes plugged in the gas plenum, in such a manner as not to affect the heat transfer characteristic of the steam generator. Then, this spare heat transfer tube is connected in place of the severed defective tube, also in the gas plenum.

In case that the leaking accident is not an incidental one, i.e. in case that the leaking accident is attributable to any structural defect or exhaustion of the life of the tube material, it is necessary to take a countermeasure for preventing recurrence of the accident, not only for the defective tube but for the other sound tubes as well. In such a case, a large scale repair work including removal of sodium scale will become necessary. According to the invention, as stated before, it is possible to correctly judge whether such a large scale repair work is necessary, through the minute inspection of the defective part.

It will be seen from the foregoing description that, according to the invention having described construction, it is possible to exactly detect the position of defect promptly and surely, and to thoroughly investigate the cause of the defect, which in turn contributes to the prevention of recurrence of the accident. In addition, it is possible to correctly judge the scale or extent of the required repair. In case that the accident is an incidental and local one, the safe condition can be recovered in a short period of time by a repair making use of the device of the invention.

As a result, according to the invention, the reliability and the efficiency of use of the liquid metal handling apparatus are remarkably improved.

Although the present invention has been described with reference to the preferred embodiments thereof, many modifications and alternations may be made within the spirit of the present invention.

What is claimed is:

1. A method of detecting defects in a liquid metal handling instrument wherein said instrument has a conduit structure invisible from the outside of said instrument, comprising the steps of: disposing said conduit structure in a cylindrical vessel filled with an inert gas; sealing said vessel; filling said conduit structure with a liquid inactive to said liquid metal to thereby permit said liquid to leak out of a defective spot of said conduit structure; and inserting a fiber scope into said vessel to thereby detect said defective spot of said conduit structure from which said liquid leaks.

2. The method according to claim 1, in which said liquid filled in said conduit structure is pressurized to permit said liquid to jet out from said defective spot, whereby an exact position of said defective spot is detected.

3. The method according to claim 1, in which said liquid inactive to the liquid metal is toluene.

4. A method of detecting defects in a heat exchanger having a heat transfer tube nest for use in liquid sodium, comprising the steps of: disposing said heat transfer tube nest in a cylindrical vessel filled with an inert gas; sealing said vessel; filling said tube nest with toluene to thereby permit said toluene to leak out of a defective spot of said tube nest; and inserting a fiber scope into said vessel to thereby detect said defective spot of the tube nest from which said toluene leaks.

5. An apparatus for detecting defects in liquid metal handling instrument wherein said instrument has a conduit structure invisible from the outside of said instrument, comprising:
- a cylindrical vessel large enough to accommodate said conduit structure,
- means for supplying a liquid inactive to said liquid metal into said conduit structure,
- means for supplying an inert gas into said vessel such that said vessel is filled with the inert gas;
- a juncture member closely fitted to one end of said cylindrical vessel,
- means for securing said juncture member for hanging down said cylindrical vessel,
- a closure member at the other end of said cylindrical vessel to thereby maintain an inert gas atmosphere within said cylindrical vessel, and
- a fiber scope,
  said vessel having means for releasably attaching a glove, and an opening through which said fiber scope is inserted into said vessel.

6. The apparatus according to claim 5, in which said cylindrical vessel is made of a transparent plastic material.

7. The apparatus according to claim 5, in which said cylindrical vessel has a plurality of band means around the body portion thereof, thereby preventing said vessel from being abnormally expanded.

8. The apparatus according to claim 5, in which said means for releasably attaching a glove includes a tubular member having an inner end penetrated into said cylindrical vessel and outer end exposed to the atmosphere, a sealing plate swingably attached to the penetrated inner end of said tubular member for preventing outward flow of the inert gas, and a glove which is sealingly connected at its opening portion to the exposed outer end of said tubular member.

* * * * *